(12) United States Patent
Doumen

(10) Patent No.: US 10,552,588 B2
(45) Date of Patent: ***Feb. 4, 2020

(54) ENABLING A SOFTWARE APPLICATION TO BE EXECUTED ON A HARDWARE DEVICE

(71) Applicant: IRDETO B.V., Hoofddorp (NL)

(72) Inventor: Jeroen Mathias Doumen, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,930

(22) Filed: Jan. 19, 2018

(65) Prior Publication Data

US 2018/0232502 A1     Aug. 16, 2018

Related U.S. Application Data

(63) Continuation of application No. 14/008,419, filed as application No. PCT/EP2012/054826 on Mar. 19, 2012, now Pat. No. 9,910,970.

(30) Foreign Application Priority Data

Mar. 30, 2011    (EP) ..................... 11160420

(51) Int. Cl.
*G06F 21/00* (2013.01)
*G06F 21/12* (2013.01)
*G06F 21/72* (2013.01)

(52) U.S. Cl.
CPC ............ *G06F 21/12* (2013.01); *G06F 21/121* (2013.01); *G06F 21/123* (2013.01); *G06F 21/125* (2013.01); *G06F 21/72* (2013.01)

(58) Field of Classification Search
None
See application file for complete search history.

(56) References Cited

U.S. PATENT DOCUMENTS 5,473,692 A    12/1995   Davis
5,530,752 A    6/1996   Rubin
(Continued)

FOREIGN PATENT DOCUMENTS

EP    2 461 564 A1    6/2012
EP    2 506 174 A1    10/2012
(Continued)

OTHER PUBLICATIONS

Extended European Search Report issued in corresponding application No. 11160420.3, dated Mar. 22, 2012 16 pages.
(Continued)

*Primary Examiner* — Maung T Lwin
(74) *Attorney, Agent, or Firm* — Rimon PC; Marc Kaufman

(57) ABSTRACT

The invention provides a method, a hardware circuit and a hardware device for enabling a software application to be executed on a hardware device in dependence of the hardware circuit, while preventing the execution of a binary copy of the application in another hardware device. Challenge data originating from the software application is input to a hardware circuit of the hardware device, wherein the hardware circuit is configured to perform a deterministic function. Response data is generated by the hardware device, which is used to manipulate at least a part of the software application to thereby enable the software application to be executed.

17 Claims, 8 Drawing Sheets

(56) References Cited

U.S. PATENT DOCUMENTS

| | | | |
|---|---|---|---|
| 6,075,862 A | 6/2000 | Yoshida et al. | |
| 6,363,486 B1 | 3/2002 | Knapton, III | |
| 6,480,959 B1 | 11/2002 | Granger et al. | |
| 6,792,528 B1 | 9/2004 | Hou | |
| 7,111,167 B1 | 9/2006 | Yeung et al. | |
| 7,111,285 B2 | 9/2006 | Smith et al. | |
| 7,117,376 B2* | 10/2006 | Grawrock | G06F 21/34 380/277 |
| 7,243,236 B1* | 7/2007 | Sibert | G06F 21/51 380/255 |
| 7,437,569 B2* | 10/2008 | Le Quere | G06F 21/72 713/189 |
| 8,051,299 B2 | 11/2011 | Saunier | |
| 8,312,297 B2* | 11/2012 | Sato | G06F 21/14 713/190 |
| 9,910,970 B2* | 3/2018 | Doumen | G06F 21/121 |
| 2002/0194470 A1 | 12/2002 | Grupe | |
| 2003/0110388 A1 | 6/2003 | Pavlin et al. | |
| 2003/0188187 A1 | 10/2003 | Uchida | |
| 2003/0188231 A1 | 10/2003 | Cronce | |
| 2004/0139340 A1 | 7/2004 | Johnson et al. | |
| 2005/0244003 A1 | 11/2005 | Nagai et al. | |
| 2006/0137022 A1* | 6/2006 | Kilian-Kehr | G06F 21/10 726/27 |
| 2006/0210082 A1 | 9/2006 | Devadas et al. | |
| 2006/0291664 A1 | 12/2006 | Suarez et al. | |
| 2007/0113103 A1 | 5/2007 | Ye et al. | |
| 2007/0198857 A1 | 8/2007 | Gidalov | |
| 2007/0220500 A1 | 9/2007 | Saunier | |
| 2008/0077805 A1 | 3/2008 | Catherman et al. | |
| 2008/0089521 A1 | 4/2008 | Le Saint et al. | |
| 2008/0175389 A1 | 7/2008 | Kim et al. | |
| 2008/0263366 A1 | 10/2008 | G | |
| 2008/0301468 A1 | 12/2008 | Murase et al. | |
| 2009/0083521 A1 | 3/2009 | Sato et al. | |
| 2009/0094601 A1 | 4/2009 | Vstovskiy et al. | |
| 2009/0122989 A1 | 5/2009 | Asnaashari et al. | |
| 2010/0122088 A1* | 5/2010 | Oxford | G06F 21/10 713/168 |
| 2010/0268949 A1* | 10/2010 | Schuetze | H04L 9/002 713/168 |
| 2011/0091035 A1 | 4/2011 | Spracklen et al. | |
| 2011/0259957 A1 | 10/2011 | Tsai | |
| 2011/0293096 A1 | 12/2011 | Reilly et al. | |
| 2014/0229744 A1 | 8/2014 | Doumen | |

FOREIGN PATENT DOCUMENTS

| | | |
|---|---|---|
| WO | 2005/064433 A1 | 7/2005 |
| WO | 2012/130658 A1 | 10/2012 |

OTHER PUBLICATIONS

PCT International Search Report and Written Opinion issued in corresponding application No. PCT/EP2012/054826, dated Jun. 18, 2012, 17 pages.

Song et al., "The AES-CMAC Algorithm," University ofWashington/ Samsung Electronics/Nagoya UniversitY,—Jun. 2006, pp. 1-20, 20 pages.

Office Action issued in related European Application No. 11160420. 3, dated Jun. 2, 2017, 6 pages.

Non-Final Rejection dated Oct. 15, 2015, in corresponding U.S. Appl. No. 14/008,419, 32 pages.

Final Rejection dated Jul. 11, 2016, in corresponding U.S. Appl. No. 14/008,419, 44 pages.

Non-Final Rejection dated Jan. 11, 2017, in corresponding U.S. Appl. No. 14/008,419, 32 pages.

Final Rejection dated Jul. 17, 2017, in corresponding U.S. Appl. No. 14/008,419, 33 pages.

Notice of Allowance dated Oct. 26, 2017, in corresponding U.S. Appl. No. 14/008,419, 34 pages.

International Preliminary Report on Patentability issued by WIPO on Oct. 10, 2013 in connection with international Patent Application No. PCT/EP2012/054826, 13 pages.

* cited by examiner

ENABLING A SOFTWARE APPLICATION TO BE EXECUTED ON A HARDWARE DEVICE

CROSS-REFERENCE TO RELATED APPLICATIONS

The present application is Continuation of U.S. application Ser. No. 14/008,419 filed on Apr. 15, 2014 and titled Enabling a Software Application To Be Executed On a Hardware Device, which is a National Stage Entry of PCT/EP2012/054826 filed on Mar. 19, 2012, which claims priority to European Patent Application 11160420.3, filed on Mar. 30, 2011; the disclosures of which are incorporated herein by reference in their entirety.

FIELD OF THE INVENTION

The present invention relates to protecting software applications. More specifically, the invention relates to enabling a software application to be executed on a hardware device.

BACKGROUND

Software obfuscation is a known technology for implementing software programs such that they are hard to reverse engineer. This technology typically includes the replacing of software functions with a sequence of table lookup operations and merging the function lookup with transform functions that make it substantially infeasible to discover the function and the function parameters. The resulting secured software program performs input and/or output operations that consist of transformed parameters. These transformed parameters may require specific adaptations in modules interfacing with the secured software program.

Data and software obfuscation techniques make use of transformation functions to obfuscate intermediate results. The concept of transformation functions differs from encryption, which is clarified in general with reference to FIG. 1.

Assume that there exists an input domain ID with a plurality of data elements in a non-transformed data space. An encryption function E using some key is defined that is configured to accept the data elements of input domain ID as an input to deliver a corresponding encrypted data element in an output domain OD. By applying a decryption function D using a key that corresponds to the key used by the encryption function E, the original data elements of input domain ID can be obtained by applying the decryption function D to the data elements of output domain OD. In a non-secure environment (typically referred to as "white-box"), an adversary is assumed to know input and output data elements and have access to internals of encryption function E during execution. Unless extra precautions are taken in this environment, the key can be derived.

Additional security can be obtained in a non-secured environment by applying transformation functions to the input domain ID and output domain OD, i.e. the transformation functions are input- and output operations. Transformation function $T_1$ maps data elements from the input domain ID to transformed data elements of transformed input domain ID' of a transformed data space. Similarly, transformation function $T_2$ maps data elements from the output domain OD to the transformed output domain OD'. Transformed encryption and decryption functions E' and D' can now be defined between ID' and OD'. In case inverse transformations are to be performed, e.g. when results are to be communicated to the non-transformed space, $T_1$ and $T_2$ are injections.

Using transformation functions $T_1$, $T_2$, together with encryption techniques implies that, instead of inputting data elements of input domain ID to encryption function E to obtain encrypted data elements of output domain OD, transformed data elements of domain ID' are input to transformed encryption function E' by applying transformation function $T_1$. Transformed encryption function E' combines the inverse transformation function $T_1^{-1}$ and the transformation function $T_2$ in the encryption operation to protect the confidential information, such as the key. Then transformed encrypted data elements of domain OD' are obtained. Keys for encryption functions E or decryption function D cannot be retrieved when analyzing input data and output data in the transformed data space.

One of the transformation functions $T_1$, $T_2$ should be a non-trivial function. In case, $T_1$ is a trivial function, the input domains ID and ID' are typically the same domain. In case, $T_2$ is a trivial function, the output domains are typically the same domain.

In general, secured software applications use transformed intermediate results which are unusable when intercepted. This property enables the protection of confidential data in secured software applications. In order to enable the secured software application to limit its functionality to a few (or one) particular devices, several technologies are known.

The transformation technology can be used to secure a wide range of software programs. FIG. 2 and FIG. 3 illustrate a known example of how a physical smart card used in a digital TV environment (see FIG. 2) can be replaced by a secured software implementation of the smart card functionality (see FIG. 3). It is to be understood that the present invention is not limited to the field of digital TV.

FIG. 2 schematically shows an example of a typical digital TV receiver 2a that receives encrypted digital TV content from a head-end 1 and outputs a signal to an output device 4 for displaying the digital TV content to an end-user. Arrows indicate a data flow in the direction as indicated. The head-end 1 transmits the digital TV content to a large number of receivers 2a. The receiver 2a uses an input module 21 to acquire the transmitted digital TV signal, which is subsequently provided to a content processing module 22a. The content processing module 22a is typically based on a general purpose processing unit 23a (e.g. using a 32 bit CPU) extended with a secured electronic circuit 24a to implement security functions such as encryption, decryption and secure key storage. Such processing may involve processing steps implemented in a detachably attached smart card 3. The result of the content processing is a signal suitable for rendering on the output device 4 such as a TV set.

The head-end 1, secured circuit 24a and smart card 3 are secured modules that are implemented such that it is difficult for an attacker to modify its intended operation. The input module 21, processing unit 23a, output device 4 and the interfaces between the modules are typically accessible to an attacker, so their proper operation cannot be relied upon.

FIG. 3 schematically shows an alternative example of a known digital TV receiver 2b that receives encrypted digital TV content from a head-end 1 and outputs a signal to an output device 4 for displaying the digital TV content to an end-user. Arrows indicate a data flow in the direction as indicated. The head-end 1 transmits the digital TV content to a large number of receivers 2b. The receiver 2b uses an input module 21 to acquire the transmitted digital TV signal, which is subsequently provided to a content processing module 22*b*. The content processing module 22*b* is typically based on a general purpose processing unit 23*b* (e.g. using a 32 bit CPU) extended with a secured electronic circuit 24*b* to implement security functions such as encryption, decryption and secure key storage.

Given the common availability of a secured circuit module 24*b*, the smart card 3 of FIG. 2 can be replaced by a secured software implementation running in the content processing module 22*b*. Hereto the processing unit 23*b* is configured with additional software for the functions that used to be implemented by the smart card.

As in the example of FIG. 2, the head-end 1 and secured circuit 24*b* are secured modules that are implemented such that it is difficult for an attacker to modify its intended operation. The input module 21, processing unit 23*b*, output device 4 and the interfaces between the modules are typically accessible to an attacker, so their proper operation cannot be relied upon. In order to secure the smart card functions in the to the attacker accessible environment of the processing unit 23*b*, the functions are implemented using secured software technology. The secured circuit 24*b* contains a memory for a set of secret keys that are used together with the output of the processing unit 23*b* to derive content keys for use in a descrambling circuit of the secured circuit 24*b*. One of the secret keys is installed during the manufacturing process. This so called Chip Secret Key is used to securely load other secret keys. A key loading message is embedded in the secured software and it is used to load a known secret key in the secure module. The secured software also has the fixed key encryption routine to encrypt a content key with the secret key that is stored in encrypted form in the key loading message. The fixed key encryption routine in the secured software application limits the application to execute on the device that can decrypt the key loading message associated with the secured software application.

The known technologies for enabling an obfuscated software application to be executed on a particular hardware device, also known as node locking, have in common that the output of a processing unit running obfuscated software is used by a secured circuit as an input to one or more security functions of the secured circuit. If the output of the processing unit is incorrect, then the secured circuit will not be able to perform the security function correctly. It is not prevented though that the software application itself can be executed. E.g. in the examples of FIG. 2 and FIG. 3 the output of the processing unit 23*a*, 23*b* is used by the secured circuit 24*a*, 24*b* as an input key enabling the decryption of the digital TV content or as a qualifier that the receiver 2*a*, 2*b* has knowledge about a (secret) key.

It is known that a software application running in a processing unit may poll predefined memory locations and use the resulting data in the further execution of the application. If the resulting data is incorrect then the software application will stop functioning correctly. The memory location is e.g. a specific hardware register containing e.g. unique values or cryptographic keys. The security provided by this polling method is limited, because the content of the memory locations may be modified.

It is known that a probing function implemented in a processing unit may e.g. activate a physically unclonable function (PUF) that produces a response result based on a challenge input provided to the function. PUFs are difficult to implement, because they have an initialisation problem. A further problem associated with PUFs is that a sender of a challenge input needs to know the possible response output of the PUF when triggered by the challenge input beforehand, because each PUF in each receiver is unique and produces an unpredictable response to a challenge. The PUF can only be characterised by a suitably large set of challenge-response pairs which may be obtained at manufacturing time or at a later stage in the deployment of the device by measuring responses to challenges.

There is a need for an improved technology for enabling the execution of a general purpose software application in a hardware device, while preventing the execution of the application or a binary copy of the application in another hardware device, without the above identified drawbacks of the prior art.

SUMMARY OF THE INVENTION

It is an object of the invention to provide for a technology enabling a software application to be executed in a hardware device, while preventing the execution of the application or a binary copy of the application in another hardware device.

According to an aspect of the invention a computer-implemented method is proposed for enabling a software application to be executed on a hardware device in dependence of a hardware circuit in the hardware device. The method comprises inputting challenge data originating from the software application to a hardware circuit of the hardware device. The hardware circuit is configured to perform a deterministic function. The method further comprises generating response data using function with the challenge data as input to the function. The method further comprises using the response data to manipulate at least a part of the software application to thereby enable the software application to be executed.

According to an aspect of the invention a hardware circuit is proposed for enabling a software application to be executed on a hardware device comprising the hardware circuit and in dependence of the hardware circuit. The hardware circuit is configured to perform a deterministic function that uses challenge data originating from the software application as input to the function to generate response data for manipulating at least a part of the software application to thereby enable the software application to be executed.

Deterministic functions differ from non-deterministic functions such as PUFs. Deterministic functions typically return the same result any time they are called with a specific set of input values. Non-deterministic functions typically return different results each time they are called with a specific set of input values. Moreover, deterministic functions can typically be expressed mathematically, whereas a non-deterministic function such as a PUF cannot be expressed mathematically.

The operation of the software application (or at least some aspects of its operation) depends on the presence of the hardware circuit with the deterministic function. Hence, it is the presence of the hardware circuit that enables the hardware device to unlock the use of the software application. Thus, the execution of a software application is anchored to a hardware circuit, hereby enabling the software application to be executed only on the particular hardware device comprising the hardware circuit with the deterministic function.

It is to be understood that enabling the software application to be executed means that the software application can be executed correctly or as intended. The response data from a hardware circuit that is not intended to be used with the software application may be used to manipulate the software application, but in this case the software application will be manipulated incorrectly, resulting in e.g. the execution of the software application to produce meaningless output or to be disruptive.

The embodiments—advantageously enable the execution of the software application in a limited number of hardware devices. If the function is unique to one hardware circuit then only the one hardware device comprising the hardware circuit with the unique function can execute the software application. If the function is unique to a group of hardware circuit then only the hardware devices comprising a hardware circuit from the group of hardware circuits can execute the software application.

The embodiments—advantageously enable the use of cryptographic functions embedded in hardware, which are known as such, in the hardware circuit. Examples of suitable cryptographic functions are an encryption function, a decryption function, a keyed hash function and a pseudo random number generator.

The embodiments advantageously enable a software application to be anchored to the hardware circuit when being executed in the hardware device. It is possible that the inverted response data is data enabling the challenge data to be derived or data wherein the challenge data is already further processes by e.g. the hardware circuit.

The embodiments advantageously enable cryptographic functions in a software application to be anchored to the hardware circuit when being executed in the hardware device.

The embodiments advantageously enable a software application to be anchored to the hardware circuit using fixed-key cryptographic functions when being executed in the hardware device.

The embodiments advantageously enable a software application to be anchored to the hardware circuit in an alternative manner when being executed in the hardware device. The inverse function compares the output of the function in the hardware device with the output of the further function in the secured software module and uses the comparison result to generate the inverted response data. If the comparison result is incorrect, then the inverted response data will be generated such that it is different from the challenge data to thereby disable further execution of the software application.

The embodiments enable an alternative to the embodiments of claims 7-10.

The embodiments advantageously enable the decryption of an encrypted software application to be anchored to the hardware circuit.

According to an aspect of the invention a computer-implemented method is proposed for adding a random data block to an encrypted software application. The method comprises dividing a software image of the encrypted software application into equal length blocks. The method further comprises determining a replacement block being one of the blocks to be replaced by the random data block. The method further comprises applying a block cipher-based message authentication code (CMAC) function to the blocks until the replacement block. The method further comprises applying a reversed block cipher-based message authentication code (CMAC) function to the blocks starting from the last block until the block after the replacement block. Tag T equals the encryption key used to encrypt the encrypted software. The tag T is decrypted using CMAC key K. The decrypted tag T is added to CMAC key K dependent value $V_1$ and the last block to obtain an intermediate result. The intermediate result is decrypted using the CMAC key K. The decrypted intermediate result is added to the preceding block to obtain a further intermediate result and repeating the decrypting and adding of further intermediate results until the replacement block. The method further comprises adding the last result from the block cipher-based message authentication code (CMAC) function to the last result of the reverse block cipher-based message authentication code (CMAC) function to obtain the random data block. The method further comprises replacing the replacement block with the random data block. The CMAC key K corresponds to a further CMAC key K in a hardware circuit of an hardware device.

Thus, an encrypted software application can be obtained, which decryption is anchored to a hardware circuit of a particular hardware device.

The embodiments advantageously enable the hardware circuit to be embedded in existing chips or chipsets.

According to an aspect of the invention a hardware device is proposes comprising a hardware circuit having one or more of the above described features.

The embodiments advantageously enable the software application to be executed on frequently used hardware devices.

According to an aspect of the invention a software application is proposed, which, when being executed by a processor, is adapted to manipulate at least a part of the software application to thereby enable the software application to be executed on a hardware device in dependence of a hardware circuit in the hardware device, by using response data that is generated using a deterministic function in the hardware circuit that uses challenge data as input to the function, wherein the challenge data originates from the software application.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
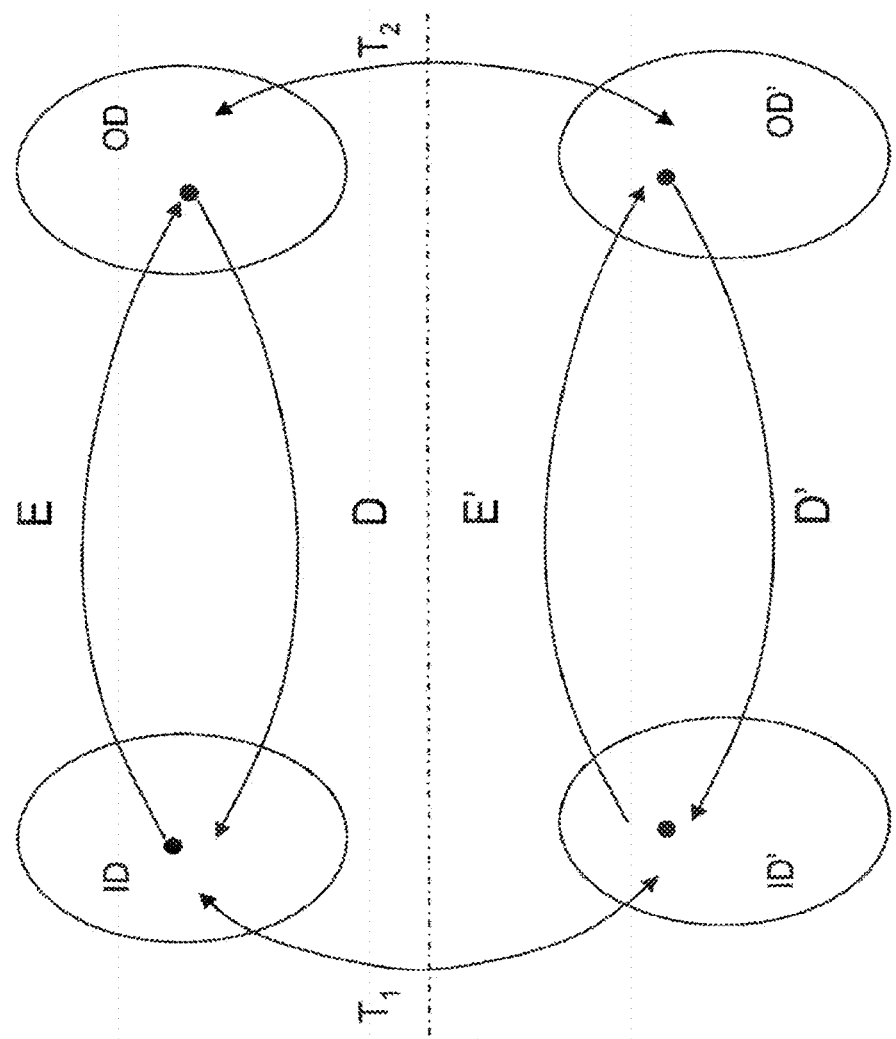
FIG. 1 is a diagram clarifying transformation functions and encryption in general terms.
Figure 2:
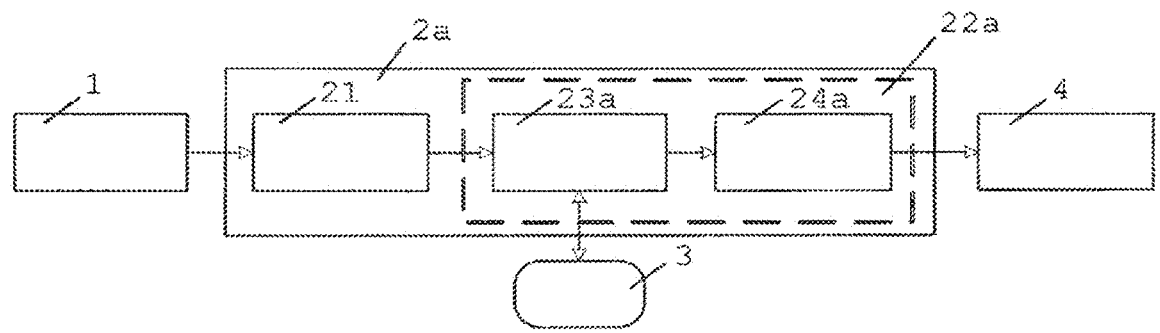
FIG. 2 is a schematic illustration of a prior art digital TV receiver system for processing encrypted digital TV content.
Figure 3:
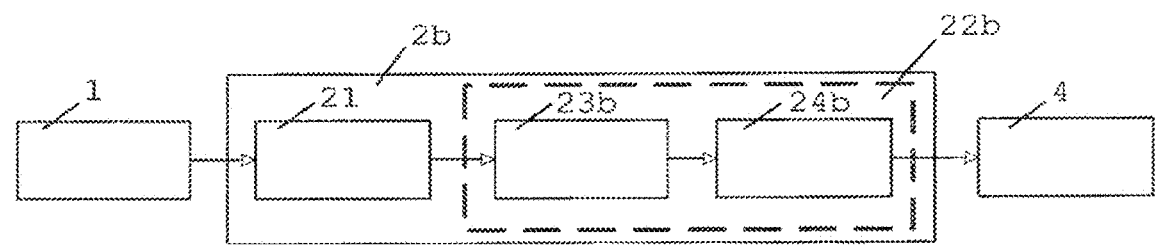
FIG. 3 is a schematic illustration of another prior art digital TV receiver system for processing encrypted digital TV content.

The invention enables a software application to be executed in a hardware device, while preventing the execution of the application or a binary copy of the application in another hardware device. Challenge data originating from the software application is input to a hardware circuit of the device. The challenge data comprises e.g. runtime data such as state information or parameter values of the application when being executed in a processing unit. Alternatively the challenge data comprises at least a part of the software image of the application itself. The hardware circuit processes the challenge data using a deterministic function, which is preferably uniquely defined for a particular hardware circuit, and returns the response data for further processing of the software application.

Various techniques can be used to implement the hardware circuit. The hardware circuit can e.g. be implemented using a transistor network on a chip. Another example is an implementation by a separate microcontroller on the same chip or using software in an isolated process. Another example is an implementation in a software process using a cryptography co-processor. Another example is to use a node-locking chip on the same printed circuit board (PCB), but external to the main chip containing the CPU. It is to be understood that the implementation of the hardware circuit is not limited to these examples and that other known techniques can be used to implement a hardware circuit that can be configured to perform a deterministic function.

Deterministic functions differ from non-deterministic functions such as PUFs. Deterministic functions typically return the same result any time they are called with a specific set of input values. Non-deterministic functions typically return different results each time they are called with a specific set of input values. Moreover, deterministic functions can typically be expressed mathematically, whereas a non-deterministic function such as a PUF cannot be expressed mathematically. It is known that the output of PUFs may be made deterministic by applying e.g. error correction mechanisms to the output, but this does not make the PUF itself deterministic.

Both secured and non-secured software applications can benefit from the invention, but for optimal results the software application is secured using e.g. software obfuscation techniques as non-secured software applications could be modified to ignore the hardware circuit.

In case of the execution of a secured software application a first module of the secured software application sends runtime data as challenge data to the hardware circuit. The hardware circuit processes the challenge data using the preferably unique function and returns the response data to a second module of the secured software application to perform an inverse operation of the preferably unique function to undo the effects of the hardware circuit. Herewith the software application is effectively anchored to the hardware circuit.

In case of the challenge data comprising at least a part of the software image of the application itself, the challenge data is input to the hardware circuit. The hardware circuit processes the data using the preferably unique function and returns the response data, which, possibly after some conversion operation, is used as a decryption key to decrypt the software image. Herewith the software application is effectively anchored to the hardware circuit.

The unique properties of the hardware circuit and the associated further processing of its output make it substantially impossible to run the software application on a different device than the device it is intended for.

The hardware circuit can be included in a wide range of CPU's (including embedded devices), GPU's and programmable I/O peripherals.

Figure 4:
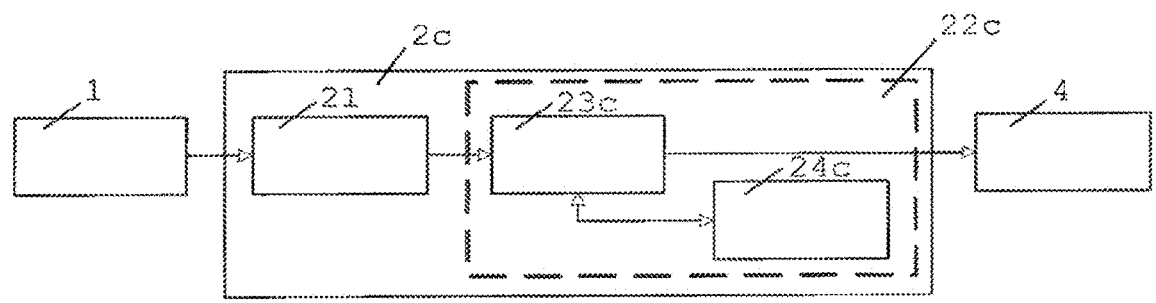
FIG. 4 is a schematic illustration of a digital TV receiver system for processing encrypted digital TV content according to an exemplary embodiment of the invention.

FIG. 4 schematically shows an example of how the invention can be used in a digital TV environment. It is to be understood that the present invention is not limited to the field of digital TV and may be used to anchor any software application to a CPU containing the hardware circuit. The hardware circuit allows whitebox attack resistant software to be strongly coupled to a single device. The invention extends the uniqueness of the hardware circuit to the software application that effectively is anchored to the hardware circuit. Such anchored software applications can be used in e.g. embedded devices such as digital TV receivers or in e.g. PC's, tablet PC's, smart phones, Internet (cloud) servers, graphics cards, or any other I/O device.

In the example of FIG. 4, a digital TV receiver 2c receives encrypted digital TV content from a head-end 1 and outputs a signal to an output device 4 for displaying the digital TV content to an end-user. Arrows indicate a data flow in the direction as indicated. The head-end end 1 transmits the digital TV content to a large number of receivers 2c. The receiver 2c uses an input module 21 to acquire the transmitted digital TV signal, which is subsequently provided to a content processing module 22c. The content processing module 22c is based on a general purpose processing unit 23c (e.g. using a 32 bit CPU) extended or embedded with a hardware circuit 24c. A secured software application for processing the encrypted digital TV content runs in the processing unit 23c. The result of the content processing is a signal suitable for rendering on the output device 4 such as a TV set.

The head-end 1 and hardware circuit 24c are implemented such that it is difficult for an attacker to modify or observe its operation. The input module 21, software executing on the processing unit 23c, output device 4 and the interfaces between the modules are typically accessible to an attacker, so their proper operation cannot be relied upon.

The hardware circuit 24c implements a unique function that processes challenge data containing e.g. state information from the secured software application. The inverse operation of the function implemented by the hardware circuit 24c is implemented in a module of the secured software application to recover the initial state. Alternatively, data enabling the initial state to be derived or data wherein the initial state is further processed is output by the module. The secured software module inherits the uniqueness of the function implemented by the secured circuit 24c. As the secured software module is preferably unique, other devices with a different hardware circuit are not capable of executing a binary copy of the software application. Replacing the secured software module with another implementation requires knowledge of the preferably unique function implemented by the hardware circuit 24c or the knowledge of the inverse function implemented by the secured software module. Both types of knowledge can only be acquired by reverse engineering. As the implementation of both the hardware circuit 24c and the secured software module is very hard to reverse engineer, it will be very difficult to execute a copy or modified copy of the application on another device.

Figure 5:
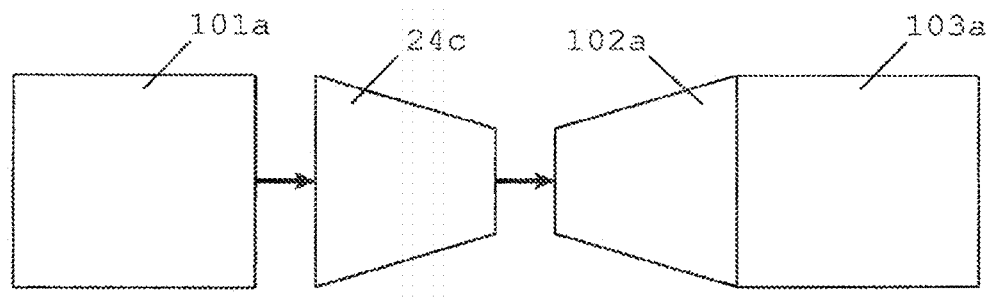
FIG. 5 is a schematic illustration of a software application that is anchored to a hardware circuit according to an exemplary embodiment of the invention.

FIG. 5 shows an exemplary embodiment of a software application that is anchored to a hardware circuit. The software application, or a part of the software application, is implemented as a sequence of secured software modules, i.e. secured software module i indicated by 101a and secured software module i+1 indicated by 103a in FIG. 5. Each secured software module 101a, 103a exchanges parameters and/or state information in a transformed domain. The secured software application is anchored to a specific device by anchoring the application to the hardware circuit 24c of the device.

The hardware circuit 24c is configured with a preferably unique function or preferably unique secret data that drives a common function that corresponds to an inverse function implemented in an inverse secured software module 102a. As the interfaces between the secured software modules are protected by transformations, the secured software application will not operate correctly if the output of secured software module i 101a is input directly into the inverse secured software module 102a. In other words, bypassing the hardware anchor is not possible as it results in a non-functional secured software application.

The inverse secured software module 102a and the secured software module i+1 103a can be implemented as a single module combining the functionalities of the two.

In an alternative exemplary embodiment, which is not shown in a figure, the order of the hardware circuit 24c and the inverse secured software module 102a is reversed. In this embodiment the inverse secured software module performs the function of the hardware circuit 24c and the hardware circuit performs the function of the inverse secured software module 102a. In this embodiment the inverse secured software module and the secured software module i 101a can be implemented as a single module combining the functionalities of the two.

The hardware circuit can be realised using e.g. an existing crypto coprocessor with an integrated block cipher such as AES. A keyed hash function, also known as message authentication code (MAC), can be used as an anchor function. These and other cryptographic functions are made unique by putting a unique (or uniquely derivable) key in each individual chipset during the personalization of hardware circuits. Other key loading mechanisms are possible as well. A block cipher-based MAC function such as Cipher-based MAC (CMAC) is particularly suitable. The CMAC standard works with any block cipher, such as e.g. AES. The CMAC standard is also known as RFC-4493.

The following examples show an implementation of a hardware anchor using the CMAC standard. It is to be understood that the invention is not limited to keyed hash functions such as CMAC and that the invention is not limited to the AES block cipher.

Figure 6:
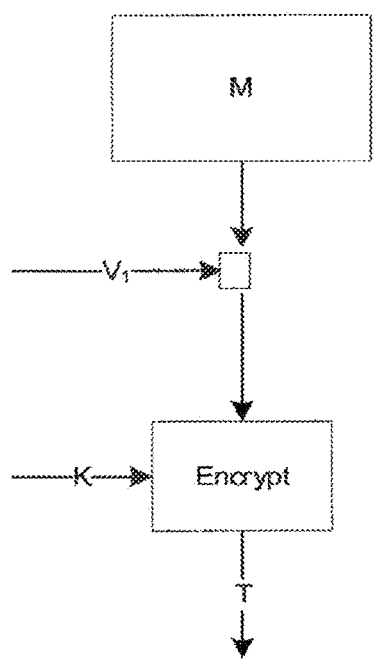
FIG. 6 is a schematic illustration of a CMAC function as used in a hardware circuit according to an exemplary embodiment of the invention.
Figure 7:
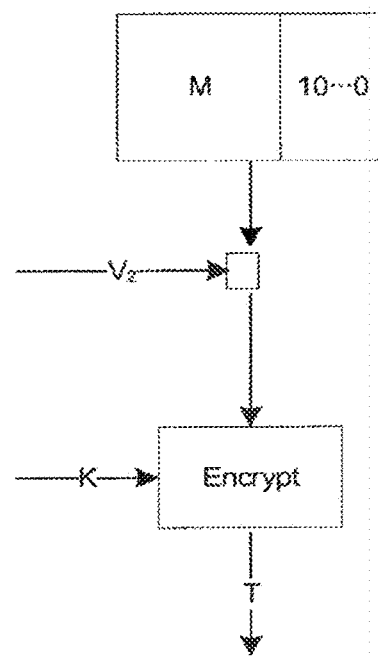
FIG. 7 is a schematic illustration of a CMAC function as used in hardware circuit according to another exemplary embodiment of the invention.

FIG. 6 shows an example of a flow chart of a CMAC calculation for a b-bit message M, i.e. the block size of the cipher is b and the message M has a length of b bits. The output of the CMAC is called a tag T. As the block cipher is used as basic building block, the tag T will also be b bits in size. The message M is added to a key-dependent value $V_1$ using add function $\oplus$ and then encrypted with a key K using an Encrypt function. If the message block is shorter than b bits, the message M is padded as shown in FIG. 7. The padding bits are indicated by 10 . . . 0. In this case, a different key-dependent value $V_2$ is used.

Figure 8:
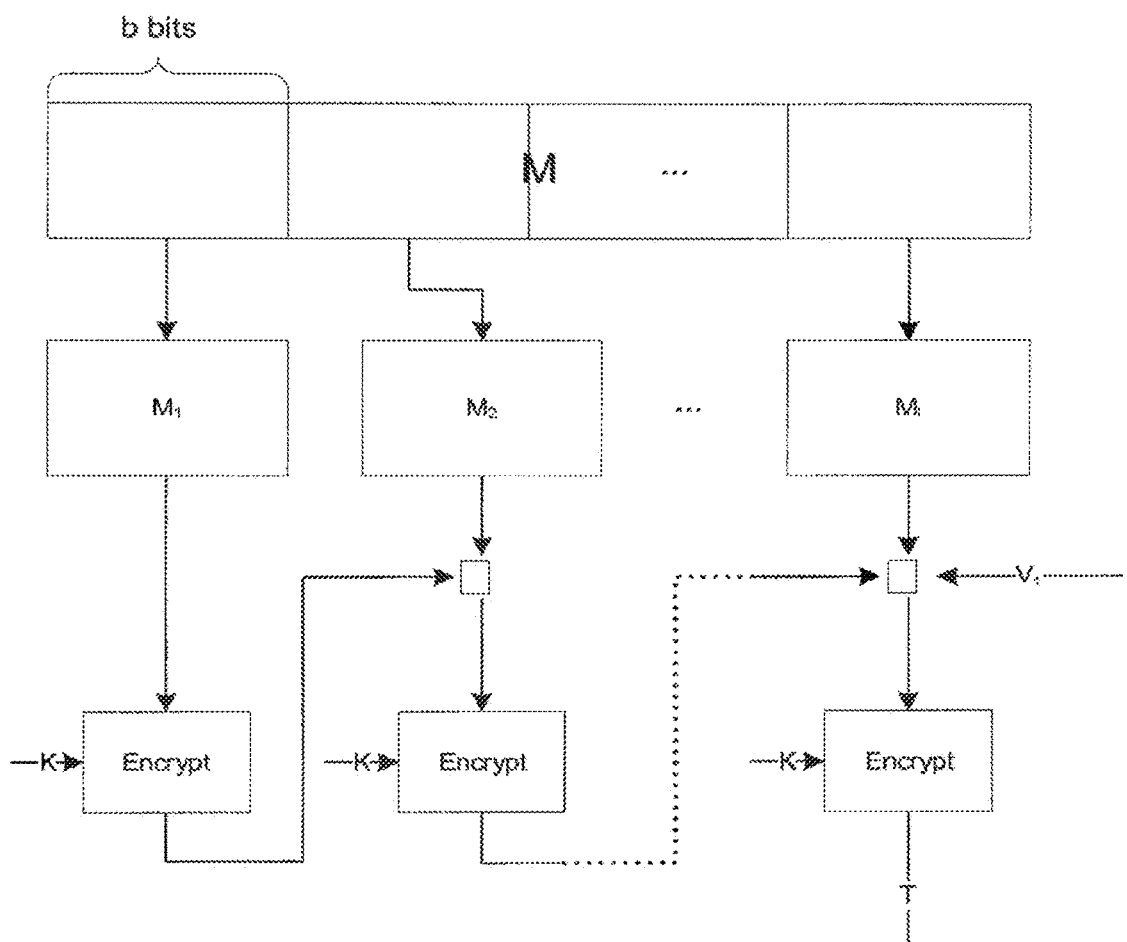
FIG. 8 is a schematic illustration of a CMAC function as used in hardware circuit according to another exemplary embodiment of the invention.

With reference to FIG. 8, to calculate the CMAC for an arbitrary-length input message M, the message is first divided into message blocks $M_l$ of length b. In the example of FIG. 8 message M has a length of l×b bits and the message M is thus divided into message blocks $M_1, M_2 \ldots M_l$. Each block $M_l$ is encrypted by the chosen block cipher under the same key K, with the output of the Encrypt function being added to the next message block. For the final block $M_l$, the key-dependent value $V_1$ is also added before this encryption.

If the length of the message M is not an exact multiple of b, then the last message block $M_l$ is padded as shown in FIG. 7. In this case, the key-dependent value $V_2$ will be used instead of $V_1$.

The derivation of $V_1$ and $V_2$ are defined as follows, wherein 'Encrypt$_K$' denotes an encryption (e.g. AES-128 encryption) using key K, '$0^b$' denotes an all-zero vector of b-bits, 'MSB' denotes the most significant bit, '<<' denotes a leftwards bit rotation, and $\oplus$ denotes an exclusive-OR.

1. Let L=Encrypt$_K$ $(0^b)$
2. If MSB(L)=0, then $V_1$=L<<1;
   Else $V_1$=(L<<1)$\oplus$ $R_b$
3. If MSB($V_1$)=0, then $V_2$=$V_1$<<1;
   Else $V_2$=($V_1$<<1)$\oplus$ $R_b$ In step 1, AES-128 with key K is applied to the all-zero input block. In step 2, $V_1$ is derived through the following operation: If the most significant bit of L is equal to 0, $V_1$ is the left-shift of L by 1 bit. Otherwise, $V_1$ is the exclusive-OR of $R_b$ and the left-shift of L by 1 bit. In step 3, $V_2$ is derived through the following operation: If the most significant bit of V, is equal to 0, $V_2$ is the left-shift of $V_1$ by 1 bit. Otherwise, $V_2$ is the exclusive-OR of $R_b$ and the left-shift of $V_1$ by 1 bit. Herein $R_b$ is a constant predefined in the CMAC standard. For example for b=128 $R_{128}$=$0^{120}10000111$.

As $V_1$ and $V_2$ only depend on the key K, they can be pre-computed once and subsequently used for many CMAC calculations. $V_1$ and $V_2$ can e.g. be stored in non-volatile memory or computed once on first use.

Key K must be securely available to the hardware circuit implementing the cryptographic function such as e.g. the CMAC function. It is to be understood that the invention is not limited to the following examples and that other alternative solutions may be used to securely make the key K available to the hardware circuit.

Key K can be implemented as an additional key, personalized into the silicon. Alternatively, key K can be derivable from an existing unique chipset key (CSUK) in some fashion, for instance by using a Davies-Meyer type of construction. Alternatively, the key K can be provided to the hardware circuit using a key ladder solution known from securely sending control words to a descrambler module using a session key, which key ladder is adapted to securely send the key K to the hardware circuit instead. Alternatively, a key transport protocol can be used as disclosed in applicant's co-pending European patent application titled "Key Transport Protocol" and having reference number 15464, which is herewith incorporated by reference in its entirety.

The key transport protocol enables a sender to transmit a key loading message to the receiver. Next, the key is loaded onto the receiver. To create the key loading message, the sender first generates a virtual key, denoted as K*. Second, the sender secures the virtual key to protect the virtual key's authenticity and confidentiality, thereby producing a secured virtual key. The secured virtual key is then transported as part of a key loading message from the sender to the receiver. The virtual key may be encrypted using a public key associated with the receiver. The secured virtual key may be created by adding a signature using a signature key associated with the sender. The virtual key K* generated by the sender and a signature verification key associated with the sender are used as inputs to a cryptographic function to produce an output. The cryptographic function is typically a part of the cryptographic function of the hardware circuit. Said output includes the key K.

Figure 14:
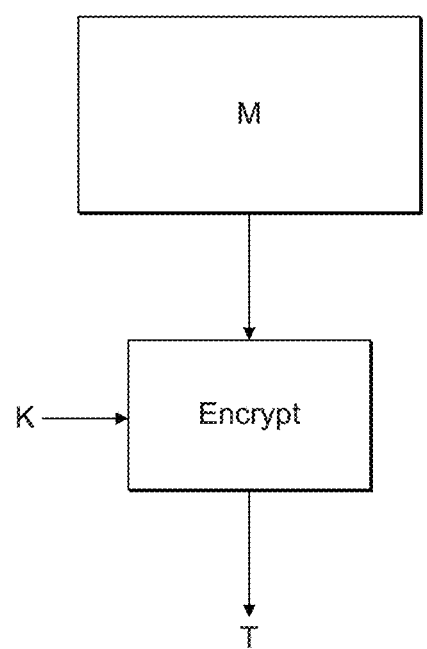
FIG. 14 is a schematic illustration of an encryption function as used in hardware circuit according to an exemplary embodiment of the invention.

FIG. 14 shows an example of a flow chart of a calculation of an output value T for a b-bit message M, which is a simplified version of the example of FIG. 6. The b-bit message M is directly encrypted with a key K using an Encrypt function. The big advantage of this variant is that it can be supported on existing silicon, by leveraging a memory-to-memory encryption using the standard key ladder. However, it is less flexible as it cannot handle an arbitrary-length input.

In the following example a secured part of a software application is anchored to a hardware circuit using lookup tables as used in e.g. AES cryptography. The hardware circuit anchor is realised using CMAC and an AES crypto coprocessor. The invention is not limited to AES. Any other block cipher may be used in the crypto coprocessor.

Software obfuscation typically implements cryptographic functions as a sequence of lookup tables. With reference to FIG. 5, in this example the hardware anchor 24c is implemented as an additional lookup table, between two "regular" secured software tables 101a and 103a. This effectively binds the secured software to the hardware uniquely.

Secured software table i 101a and secured software table i+1 103a represent a part of the secured software application that is anchored to the hardware. The output from secured software table i 101a is used as challenge data to the hardware anchor 24c, which provides a wider output. In this example the response data from secured software table i 101a is 8 bits and the output of the hardware anchor 24c is 128 bits. The secured software table i+1 103a of the secured software implementation is expanded with an inverse secured software table 102a, which transforms the wide output of the anchor 24c back to the expected input.

The inverse secured software table 102a and secured software table i+1 103a are preferably integrated to obtain a higher level of obfuscation.

Each secured software application is personalized according to the coupled hardware circuit 24c that contains a unique hardware key K. It would also be possible to give a batch of hardware circuits the same key. This action reduces the number of unique implementations.

With the hardware anchor 24c having an input of 8 bits and an output of 128 bits, the inverse table 102a has a table size of $2^{128} \times 8$.

It is possible to use CMAC to produce shorter outputs T, e.g. by using the 32 most significant bits instead of the full 128 bits. This would lead to a smaller inverse table 102a, i.e. an inverse table size of $2^{32} \times 8$ ($\approx$4096 megabytes) in the above example. Even smaller inverse table sizes may be used with even shorter outputs. The following table illustrates the table size for different output sizes (in bits) and inputs of 8 bits.

| Input | Output | Table Size |
| --- | --- | --- |
| 8 | 10 | $2^{10} \times 8 \gg 1$ kilobytes |
| 8 | 12 | $2^{12} \times 8 \approx 4$ kilobytes |
| 8 | 14 | $2^{14} \times 8 \approx 16$ kilobytes |
| 8 | 16 | $2^{16} \times 8 \approx 64$ kilobytes |
| 8 | 32 | $2^{32} \times 8 \approx 4096$ megabytes |

It is possible to optimize the inverse table 102a. For an 8-bit input, there are only $2^8$ possible (128-bit) output vectors. This means that the inverse table 102a only needs to contain those 128-bit vectors, together with their 8-bit original inputs. In this way, the inverse table size becomes $2^8=(128+8)$ bits, or about 4.25 kilobytes. The following table illustrates the table size for different input sizes (in bits) and outputs of 128 bits.

| Input | Output | Table Size |
| --- | --- | --- |
| 8 | 128 | $2^8 \times (128 + 8)$ bits $\gg$ 4 kilobytes |
| 10 | 128 | $2^{10} \times (128 + 10)$ bits $\gg$ 17 kilobytes |
| 12 | 128 | $2^{12} \times (128 + 12)$ bits $\gg$ 70 kilobytes |
| 14 | 128 | $2^{14} \times (128 + 14)$ bits $\gg$ 284 kilobytes |
| 16 | 128 | $2^{16} \times (128 + 16)$ bits $\gg$ 1152 kilobytes |

Figure 9:
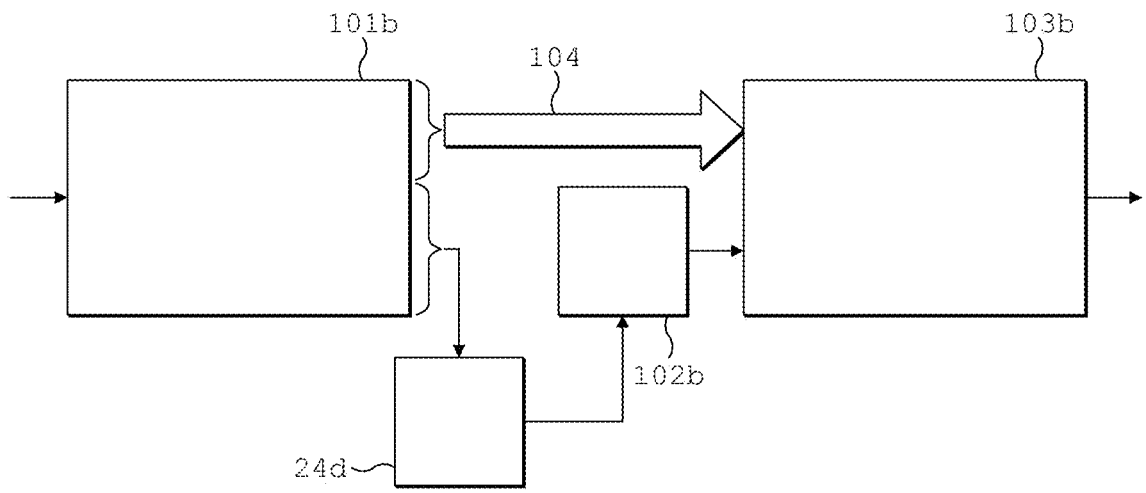
FIG. 9 is a schematic illustration of a software application that is anchored to a hardware circuit according to another exemplary embodiment of the invention.

FIG. 9 shows an exemplary embodiment of an obfuscated software application comprising a secured software part that is anchored to a hardware circuit 24d which is used during runtime. Arrows indicate data flows.

An original secured software application consisting of a first part 101b and a second part 103b is split at an arbitrary point. At this point, the execution of the first part 101b of the original secured software application is halted, and b=128 bits (in case of AES in the hardware anchor 24d) of its output are extracted and fed as challenge data to the hardware anchor 24d. The rest of the output of the original secured software application is kept as-is, which is shown as arrow 104. In order to invert the response data of the hardware anchor 24d, instead of a lookup table as shown in FIG. 5 an inverse fixed-key secured software module 102b is used. After this process, the execution continues with the second part 103b of the original secured software application using the output of the first part 101b as reconstructed by the inverse fixed-key secured software module 102b combined with the rest of the internal state 104.

For increase security, preferably the transformation space between the first part 101b and the hardware anchor 24d differs from the transformation space between the inverse fixed-key secured software module 102b and the second part 103b.

Figure 10:
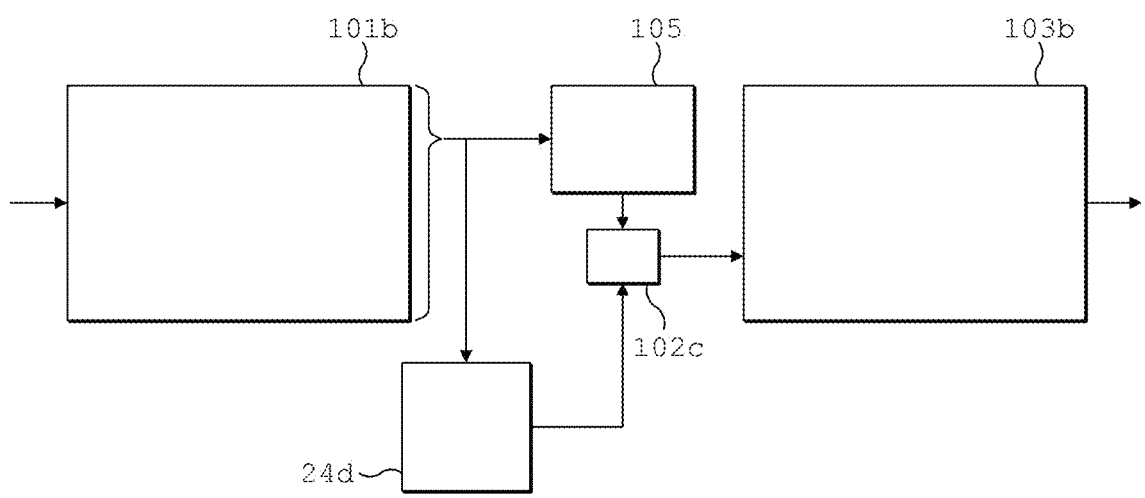
FIG. 10 is a schematic illustration of a software application that is anchored to a hardware circuit according to another exemplary embodiment of the invention.

FIG. 10 shows an alternative exemplary embodiment of a secured software application comprising a secured software part that is anchored to a hardware circuit 24d which is used during runtime. Arrows indicate data flows.

An original secured software application consisting of a first secured software part 101b and a second secured software part 103b is split at an arbitrary point. At this point, the execution of the first secured software part 101b of the original secured software application is halted, and its state is extracted and input as challenge data to the hardware anchor 24d. The state is further input to a software CMAC secured software module 105. In order to invert the response data of the hardware anchor 24d, a property-dependent transform (PDT) module 102c or any other known comparison mechanism is used, which compares the output of the CMAC secured software module 105 with the response data of the hardware anchor 25d. After this process, the execution continues in the second part 103b of the original secured software application using the state of the first part 101b as received from the PDT transform module 102c.

The advantage of the example of FIG. 10 is that any size of state vector can be handled as input. To do this, the whole CMAC construction of FIG. 8 is incorporated into the CMAC secured software module 105, which repeatedly calls a secured software encryption module just like the hardware circuit 24d.

In the end, both the CMAC secured software module 105 and the hardware circuit 24d have computed the tag T. In order to compare the result, the property-dependent transform (PDT) or other comparison mechanism is used.

It is to be understood that the state that is fed as challenge data to the hardware circuit 24d can be in a transformed form. There is no need for the hardware to learn the clear (non-transformed) values.

Figure 11:
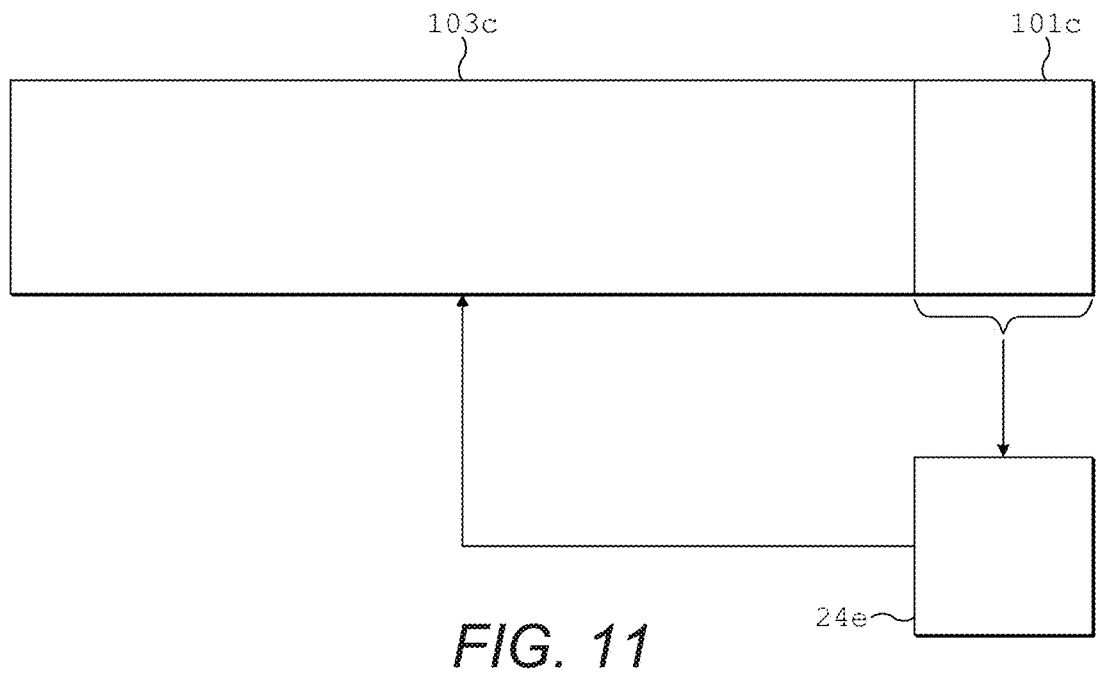
FIG. 11 is a schematic illustration of a software application that is anchored to a hardware circuit according to another exemplary embodiment of the invention.

FIG. 11 shows an exemplary embodiment enabling a secure transmission or storage of a (secured) software application in encrypted form, wherein the hardware circuit 24e is used to compute the software-application-unique decryption key for decrypting the encrypted part of the software application.

The software application comprises a loader code part 101c and an encrypted software part 103c and is created to be used on a particular device with a hardware circuit 24e. The software application is e.g. downloaded or bought from an app store.

A part of or the complete loader code 101c is input as challenge data to the hardware anchor 24d. The resulting device-unique response data is used as the decryption key for decrypting the encrypted software part 103c. When an AES coprocessor is used as shown in the previous exemplary embodiments, the decryption key will be a 128-bit value.

Figure 12:
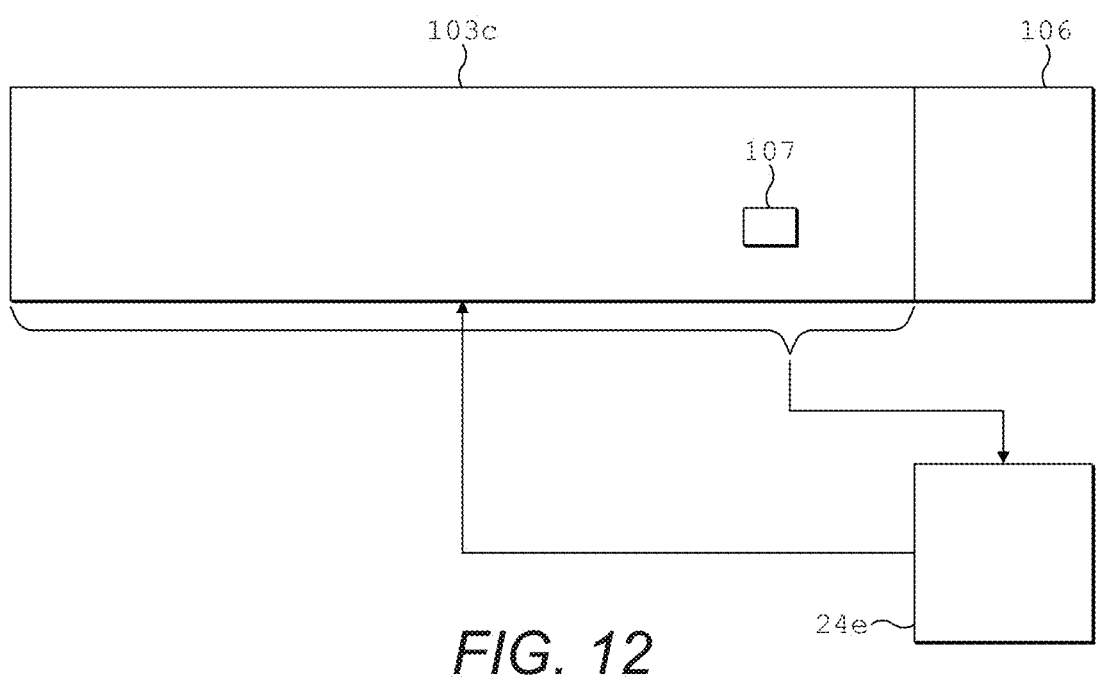
FIG. 12 is a schematic illustration of a software application that is anchored to a hardware circuit according to another exemplary embodiment of the invention.

FIG. 12 shows an alternative exemplary embodiment enabling a secure transmission or storage of a software application in encrypted form, wherein the hardware circuit 24e is used to compute the software-application-unique decryption key for decrypting the encrypted part of the software application.

The software application comprises a loader code part 106 and an encrypted software part 103c and is created to be used on a particular device with a hardware circuit 24e. A random data block 107 is part of the encrypted software part 103c, making the encrypted software part 103c unique.

A part of or the complete encrypted software part 103c is input to the hardware circuit 24d. When an AES coprocessor is used as shown in the previous exemplary embodiments, the decryption key will be a 128-bit value.

The random data block 107 in the encrypted software part 103c can be created by the provider of the encrypted software application as follows. Initially the encryption key is picked at random, and then it is backtracked what the (ciphertext) value of the random data block 107 should be.

Figure 13:
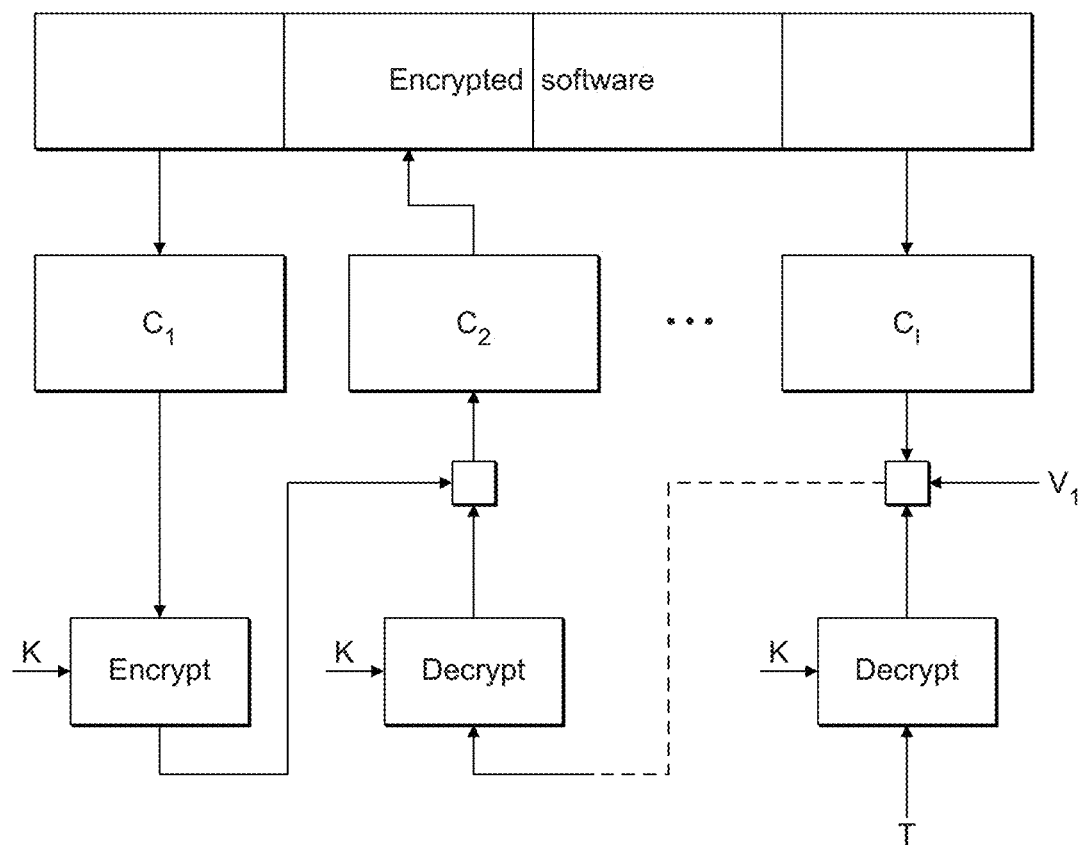
FIG. 13 is a schematic illustration of a CMAC function for creating an encrypted software application that is anchored to a hardware circuit according to an exemplary embodiment of the invention.

FIG. 13 shows an example of a calculation of the random data block 107 by a provider. As example, assume that a second block $C_2$ of the software application is to be used as random data block 107 to insert an arbitrary ciphertext block and pick the key T. It is to be understood that any and multiple blocks may be used as random data block 107.

The first block $C_1$ is processed similar to block $M_1$ as shown in FIG. 8. For the other blocks $C_2 \ldots C_t$, the calculation is reversed compared to FIG. 8: first the key T (with which the software is encrypted) is decrypted with the hardware anchor key K, which is then added to the key-dependent value $V_1$ and the last block of the encrypted software. The result is decrypted again, and added to the previous block of the encrypted software, and so on. In this way, the two calculations meet and are added up to produce the "missing" block $C_2$. The thus calculated block $C_2$ is inserted in the encrypted software part 103c as random data block 107.

The correct decryption key can be derived by the end-user device with the hardware circuit 24d that is configured with the hardware anchor key K.

It is to be understood that runtime protection such as e.g. shown in FIG. 9 and FIG. 10 may be applied in conjunction with the decryption protection such as e.g. shown in FIG. 11 and FIG. 12.

In the exemplary embodiments shown FIGS. 5, 9 and 10 the hardware circuit 24c, 24d and inverse module 102a, 102b, 102c are used in between two parts of the software application. It is to be understood that the hardware circuit and inverse module may be used at the very beginning or at the very end of the software application. If located at the very beginning, e.g. a first input to the software application is used as challenge data. If located at the very end, e.g. a final output of the software application is used as challenge data.

One embodiment of the invention may be implemented as a program product for use with a computer system. The program(s) of the program product define functions of the embodiments (including the methods described herein) and can be contained on a variety of non-transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

The invention claimed is:

1. A computer-implemented method for enabling a software application to be executed on a hardware device, said execution dependent on a hardware circuit of the hardware device, the computer-implemented method comprising:
   inputting challenge data to the hardware circuit of the hardware device, wherein the software application comprises a first part and an encrypted second part, wherein the challenge data comprises some or all of the first part, wherein the hardware circuit is configured to perform a deterministic function;
   generating response data using the deterministic function, with the challenge data used as input to the deterministic function; and
   using the response data as a decryption key to decrypt said encrypted second part to thereby enable the software application to be executed.

2. The computer-implemented method according to claim 1, wherein the deterministic function is unique to the hardware circuit.

3. The computer-implemented method according to claim 1, wherein the deterministic function is a cryptographic function.

4. The computer-implemented method according to claim 3, wherein the cryptographic function uses a cryptographic key, wherein the cryptographic key is (a) preconfigured in a memory of the hardware circuit, or (b) derived by the hardware circuit from a unique key preconfigured in a memory of the hardware circuit, or (c) derived by the hardware circuit from a key loading message received from an external source.

5. The computer-implemented method according to claim 4, wherein a key loading mechanism for deriving the key from the key loading message is unique to the hardware device.

6. A hardware circuit for a hardware device, the hardware circuit enabling a software application to be executed on the hardware device, wherein said execution is dependent on the hardware circuit, wherein the software application comprises a first part and an encrypted second part, wherein the hardware circuit is configured to perform a deterministic function that uses challenge data that comprises some or all of the first part as input to the deterministic function to generate response data for use as a decryption key to decrypt said encrypted second part to thereby enable the software application to be executed.

7. The hardware circuit according to claim 6, wherein the deterministic function is unique to the hardware circuit to enable the software application to be executed on the hardware device.

8. The hardware circuit according to claim 6, wherein the deterministic function is a cryptographic function.

9. The hardware circuit according to claim 8, wherein the cryptographic function uses a cryptographic key, wherein the cryptographic key is (a) preconfigured in a memory of the hardware circuit, or (b) derived by the hardware circuit from a unique key preconfigured in a memory of the hardware circuit, or (c) derived by the hardware circuit from a key loading message received from an external source.

10. The hardware circuit according to claim 6, wherein the hardware circuit is embedded in one of a central processing unit (CPU), a graphics processing unit (GPU) or programmable input/output (I/O) peripheral.

11. A hardware device comprising:
a hardware circuit for enabling a software application to be executed on the hardware device, said execution dependent on the hardware circuit, wherein the software application comprises a first part and an encrypted second part, wherein the hardware circuit is configured to perform a deterministic function that uses challenge data that comprises some or all of the first part as input to the deterministic function to generate response data for use as a decryption key to decrypt said encrypted second part to thereby enable the software application to be executed; and
a processor arranged to provide a challenge to said hardware circuit and execute the software application.

12. The hardware device according to claim 11, wherein the hardware device is one of a digital television receiver, a personal computer, a tablet computer, a smart phone, an Internet server, a cloud server or a graphics card.

13. A non-transitory computer readable medium having instructions encoded thereon which, when the instructions are processed by a processor, enable a software application to be executed on a hardware device, said execution dependent on a hardware circuit of the hardware device, by:
inputting challenge data to the hardware circuit of the hardware device, wherein the software application comprises a first part and an encrypted second part, wherein the challenge data comprises some or all of the first part, wherein the hardware circuit is configured to perform a deterministic function;
generating response data using the deterministic function, with the challenge data used as input to the deterministic function; and
using the response data as a decryption key to decrypt said encrypted second part to thereby enable the software application to be executed.

14. The non-transitory computer readable medium according to claim 13, wherein the deterministic function is unique to the hardware circuit.

15. The non-transitory computer readable medium according to claim 13, wherein the deterministic function is a cryptographic function.

16. The non-transitory computer readable medium according to claim 15, wherein the cryptographic function uses a cryptographic key, wherein the cryptographic key is (a) preconfigured in a memory of the hardware circuit, or (b) derived by the hardware circuit from a unique key preconfigured in a memory of the hardware circuit, or (c) derived by the hardware circuit from a key loading message received from an external source.

17. The non-transitory computer readable medium according to claim 16, wherein a key loading mechanism for deriving the key from the key loading message is unique to the hardware device.

* * * * *